(12) United States Patent
De Vaan

(10) Patent No.: US 7,316,481 B2
(45) Date of Patent: Jan. 8, 2008

(54) PROJECTION DEVICE FOR PROJECTING AN IMAGE

(75) Inventor: Adrianus Johannes Stephanes Maria De Vaan, Eindhoven (NL)

(73) Assignee: Koninlijke Philips Electronics N.V., Eindhoven (NL)

( * ) Notice: Subject to any disclaimer, the term of this patent is extended or adjusted under 35 U.S.C. 154(b) by 219 days.

(21) Appl. No.: 10/527,864

(22) PCT Filed: Aug. 8, 2003

(86) PCT No.: PCT/IB03/03643

§ 371 (c)(1),
(2), (4) Date: Mar. 16, 2005

(87) PCT Pub. No.: WO2004/028168

PCT Pub. Date: Apr. 1, 2004

(65) Prior Publication Data

US 2006/0033883 A1   Feb. 16, 2006

(30) Foreign Application Priority Data

Sep. 20, 2002   (EP) ................................. 02078909

(51) Int. Cl.
*G03B 21/14*   (2006.01)

(52) U.S. Cl. ....................... 353/20; 353/84; 353/353; 353/31; 349/9

(58) Field of Classification Search .................. 353/31, 353/30, 33, 37, 20; 349/5, 7, 8, 9, 106

See application file for complete search history.

(56) References Cited

U.S. PATENT DOCUMENTS

| 6,830,339 B2 * | 12/2004 | Maximus ....................... 353/20 |
| 2001/0008470 A1 | 7/2001 | Dewald |
| 2003/0016334 A1 * | 1/2003 | Weber et al. .................. 353/20 |

* cited by examiner

*Primary Examiner*—William C. Dowling

(57) ABSTRACT

The invention relates to a projection device for projecting an image, comprising an illumination means (1) having an entrance (13) for entering light from a light source, a polarization-selective mirror (3) for transmitting a first polarization component (42) of the light to a display panel (4) and reflecting a second component (43) back to the illumination means (1), and a display panel (4) for selecting colour components of the first polarization component for projection at a projection means (7). The display panel comprises a dichroic filter means (5) for filtering colour components of the first polarization component (42) and a controllable reflective means (6) for changing the state of polarization of the filtered colour components depending on a control signal and for reflecting the filtered colour components back to the polarization-selective mirror (3). All light that is reflected from the dichroic filter means (5) and the controllable reflective means (6) back to the polarization-selective mirror (3), having an unchanged state of polarization, is transmitted back to the illumination means (1). The reflected light having a changed state of polarization is reflected to the projection means (7) for projection.

20 Claims, 6 Drawing Sheets

PROJECTION DEVICE FOR PROJECTING AN IMAGE

Figure 1:
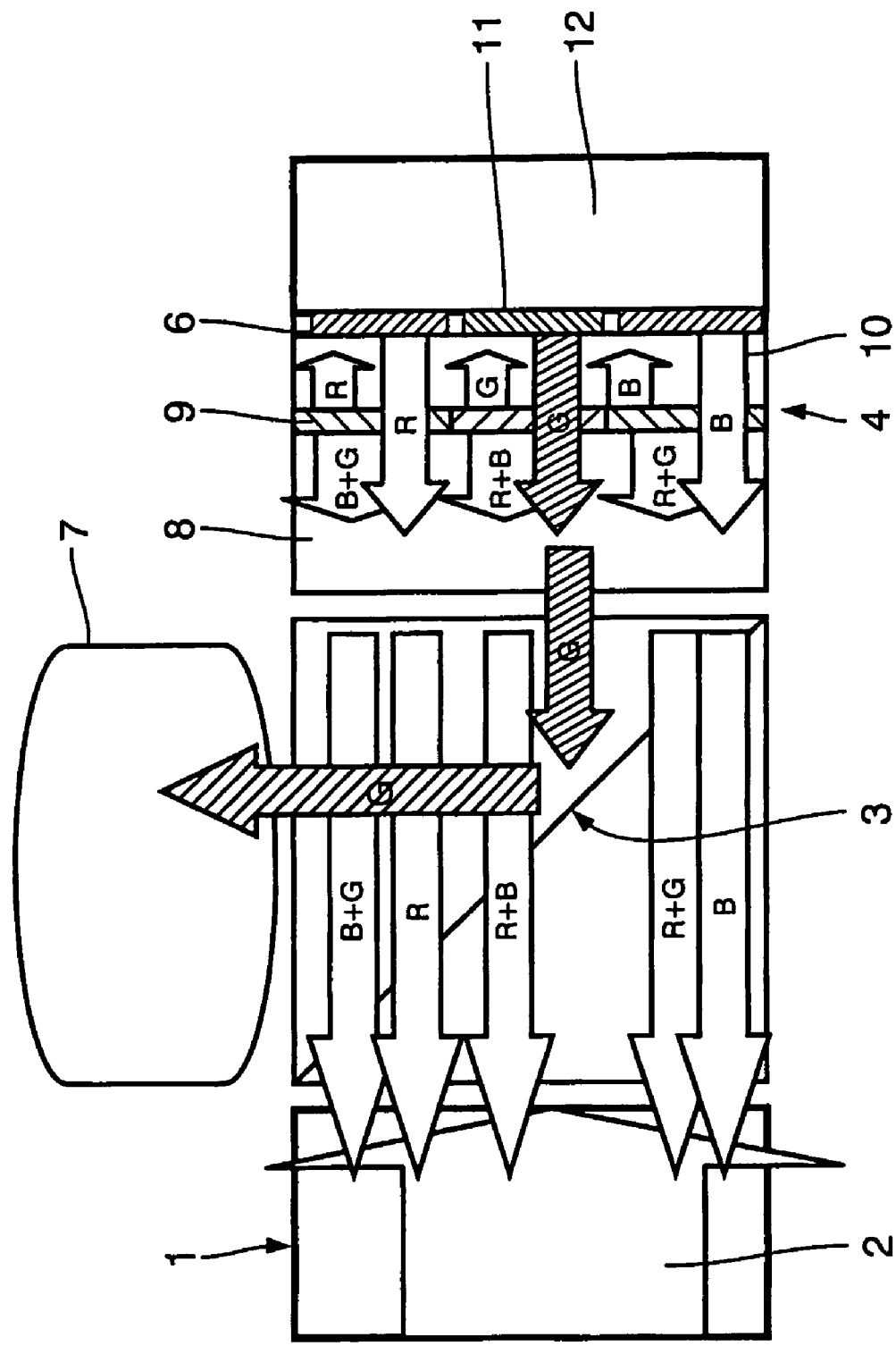

The present invention relates to a projection device for projecting an image.

For projection of colour images on LCD panels, it is common practice to superpose main colours, for example red, green and blue, for each pixel. One possibility is to provide one colour at a time. If this sequential projection of the colours is performed quickly enough, the relatively slow responding human eye will notice the sequential projection of the colours only as one single colour.

One common way of sequentially providing the main colours is by using a white light source in combination with a colour wheel as described in U.S. 2001/0008470 A1. The white light source permanently sends out white light to the colour wheel. The colour wheel is subdivided into sections with different colour filters. The turning of the wheel results in a permanent change of colours of light which is transmitted by the colour wheel.

To superpose certain components of the filtered light, a controllable reflective means must be synchronised to the colour wheel. By using the controllable reflective means, it can thus be achieved that only selected colour components are reflected through a projection means so as to obtain a certain colour by combination. To give an example, reflecting only the red and the blue component, having equal intensity, to the projection means will result in a violet display colour.

Another possibility to create a certain colour by superposing several colour components is to use a single panel for each colour component. Each panel comprises a controllable reflective means for controlling the reflection or transmission of one colour component, but all colour components are reflected and focused to one projection means to achieve the superposition of the colour components. For the example of having red, green and blue as the colour components, three panels are needed for supplying one projection means.

The main disadvantage of these known methods is the low efficiency of using the light. All the light that is not transmitted by the filter is wasted there. Furthermore, the filtered light which is not reflected or transmitted to the projection means is also wasted. Besides the pure energy efficiency, all the wasted light is somewhere in the system and might decrease the contrast of the projection means.

It is therefore an object of the present invention to provide a projection device having a significantly increased efficiency for the use of light which at the same time has a simple construction to reduce production costs.

According to the present invention, this object is achieved by a projection device as defined in claim 1, comprising:

an illumination means having an entrance for entering light from a light source, a polarization-selective mirror for transmitting a first polarization component of said light and reflecting a second polarization component, a display panel having:

a dichroic filter means for filtering colour components of said transmitted first polarization component, and a controllable reflection means for changing the state of polarization of said colour components depending on a control signal and for reflecting said filtered colour components back to said polarization selective mirror, and a projection means for projecting the image, wherein said polarization-selective mirror is adapted to reflect light of a changed state of polarization to said projection means and for transmitting light of an unchanged state of polarization back to said illumination means.

The invention is based on the idea to reflect all light that is not conducted to the projection means, back into the illumination means to recycle the light in there, so that this light can later be used for projection. The illumination means comprises an entrance for entering light from a light source. Through this entrance, white light first enters the device. From the illumination means, the light reaches a polarization-selective mirror. At this polarization-selective mirror, a first polarization component of the light is transmitted to a display panel. At the display panel, this first polarization component reaches a dichroic filter means which comprises several different filter sections. Each filter section transmits one colour component of the first polarization component to a corresponding controllable reflection means. Each controllable reflection means changes the state of polarization of the corresponding colour component which is to be conducted to the projection means.

From all controllable reflection means, the colour components are reflected back to the polarization-selective mirror. These colour components, which have a changed state of polarization, are reflected at the polarization-selective mirror to the projection means. The other colour components are transmitted back through the polarization-selective mirror and reach the illumination means again. All colour components, which have already been reflected at the dichroic filter means, have not changed the state of polarization and are thus also transmitted back through the polarization-selective mirror into the illumination means.

The second polarization component of the light that reaches the polarization-selective mirror from the illumination means is reflected at the polarization-selective mirror and does not reach the display panel this time.

It is preferred that the illumination means comprises an entrance mirror for reflecting light transmitted back from this polarization-selective mirror back to said polarization-selective mirror. In this way, the reflected light can later be used for projection.

It is further preferred that the illumination means comprises a quarter-wave film mounted on the entrance mirror to change the state of polarization of light reflected at the entrance mirror. This has the advantage that the second polarization component of the light can be changed and thus this light component can also reach the display panel and occasionally be part of the projected light.

In a further preferred embodiment, the projection device is characterized in that the illumination means comprises reflective boundaries for reflecting incident light without changing the light distribution. This additional feature reduces the loss of light at the boundaries of the illumination means. Therefore, it increases the efficiency of the projection device.

The optical characteristics of the illumination means can be improved by a preferred embodiment wherein the illumination means comprises a glass prism.

In a further preferred embodiment, the polarization-selective mirror is made of two prisms carrying a reflective polarizer, in particular a wire grid polarizer, in between. This is a simple way of forming a polarization-selective mirror, which additionally provides good optical characteristics.

In a further preferred embodiment, the polarization-selective mirror is integrated in a part of the illumination means, using a PBS prism. This integration of the polarization-selective mirror has a space saving effect and also increases the optical properties of the projection device.

In another preferred embodiment, a clean-up polarizer is arranged in front of said projection means to filter light having the wrong state of polarization. The polarization-selective mirror reflects all colour components of the light that is reflected from the display panel having a changed state of polarization with a high reliability. However, the polarization-selective mirror does not perfectly transmit light having an unchanged state of polarization. As a result, some light that is not supposed to be projected is reflected to the projection means and might cause a decrease of contrast. To avoid this decrease of contrast, the light having an unchanged state of polarization, and which therefore is only reflected to the projection means by accident, is filtered by the clean-up polarizer.

Another preferred embodiment of the projection device is characterized in that an imaging prism for reflecting light to the projection means, which is made of glass, has a low stress birefringence constant. An improvement of the optical characteristics of the projection device can thus be achieved.

In a further preferred embodiment, the projection device is characterized in that said display panel comprises a projection area for reflecting light to the projection means having a cross-sectional area which is smaller than the cross-sectional area of the illumination means and a reflection area outside the projection area with a reflective layer for reflecting light back to the illumination means. According to this embodiment, the area around the projection area of the display panel reflects light back to the illumination means to avoid wasting of light.

The projection device according to a further preferred embodiment is characterized in that the dichroic filter means comprises a filter pattern which is made of cholesteric filters or of a stack of layers of interference filters. These kinds of filters provide a good efficiency with respect to costs and optical properties. However, it is not excluded to make use of other filters.

Figure 2:
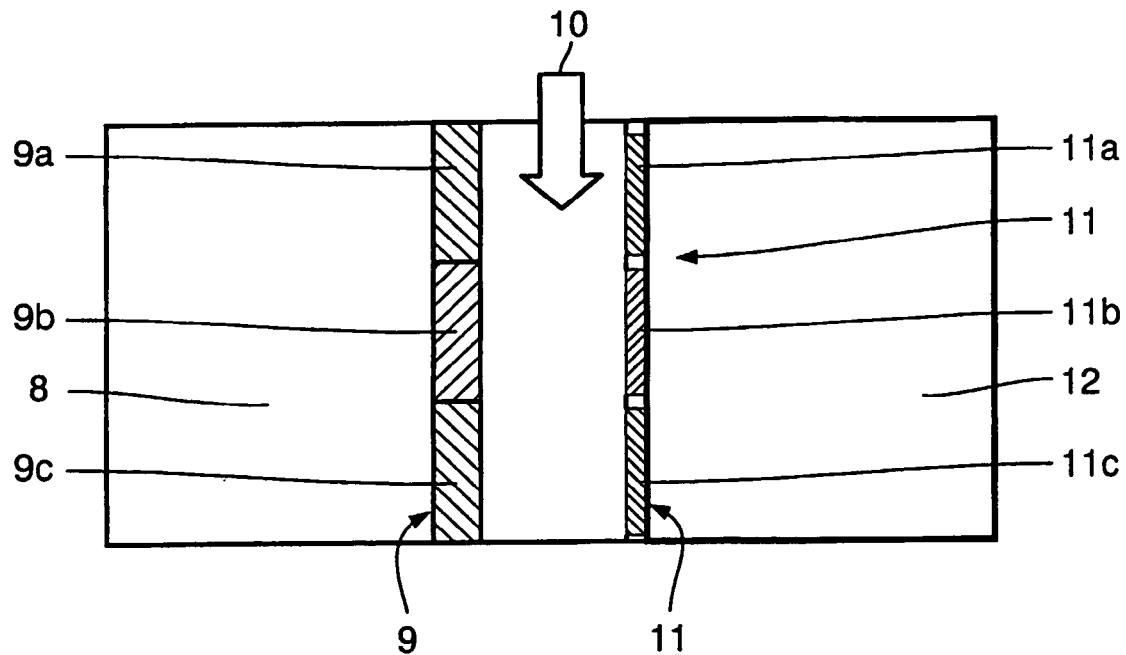
Figure 3:
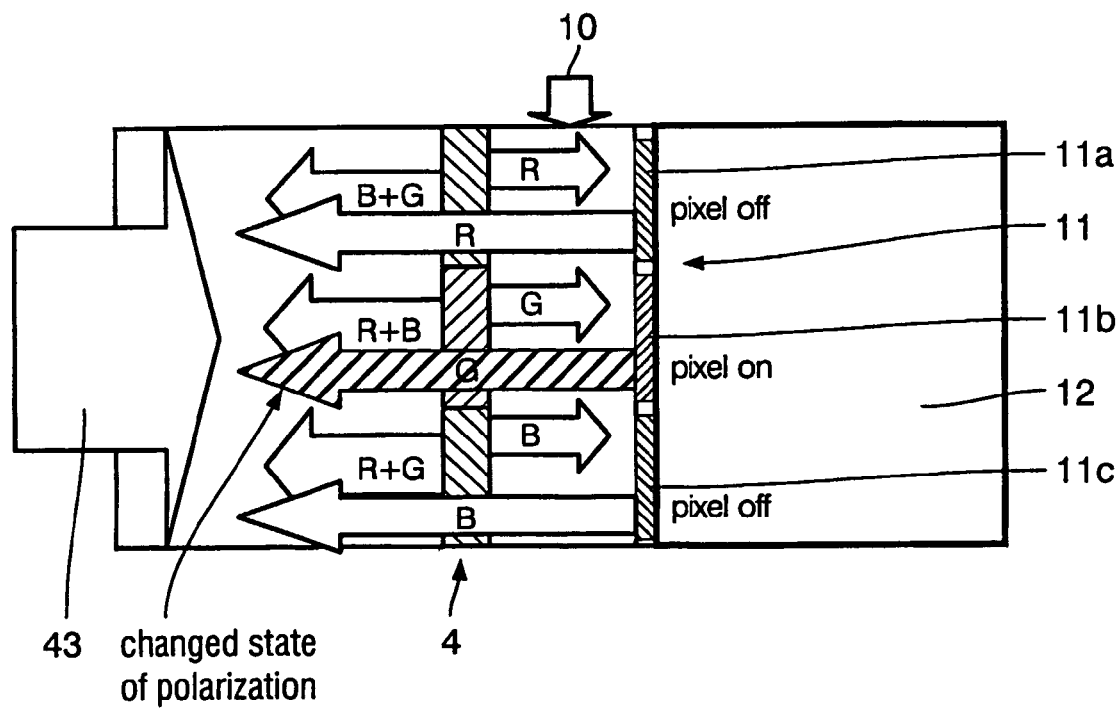
Figure 4:
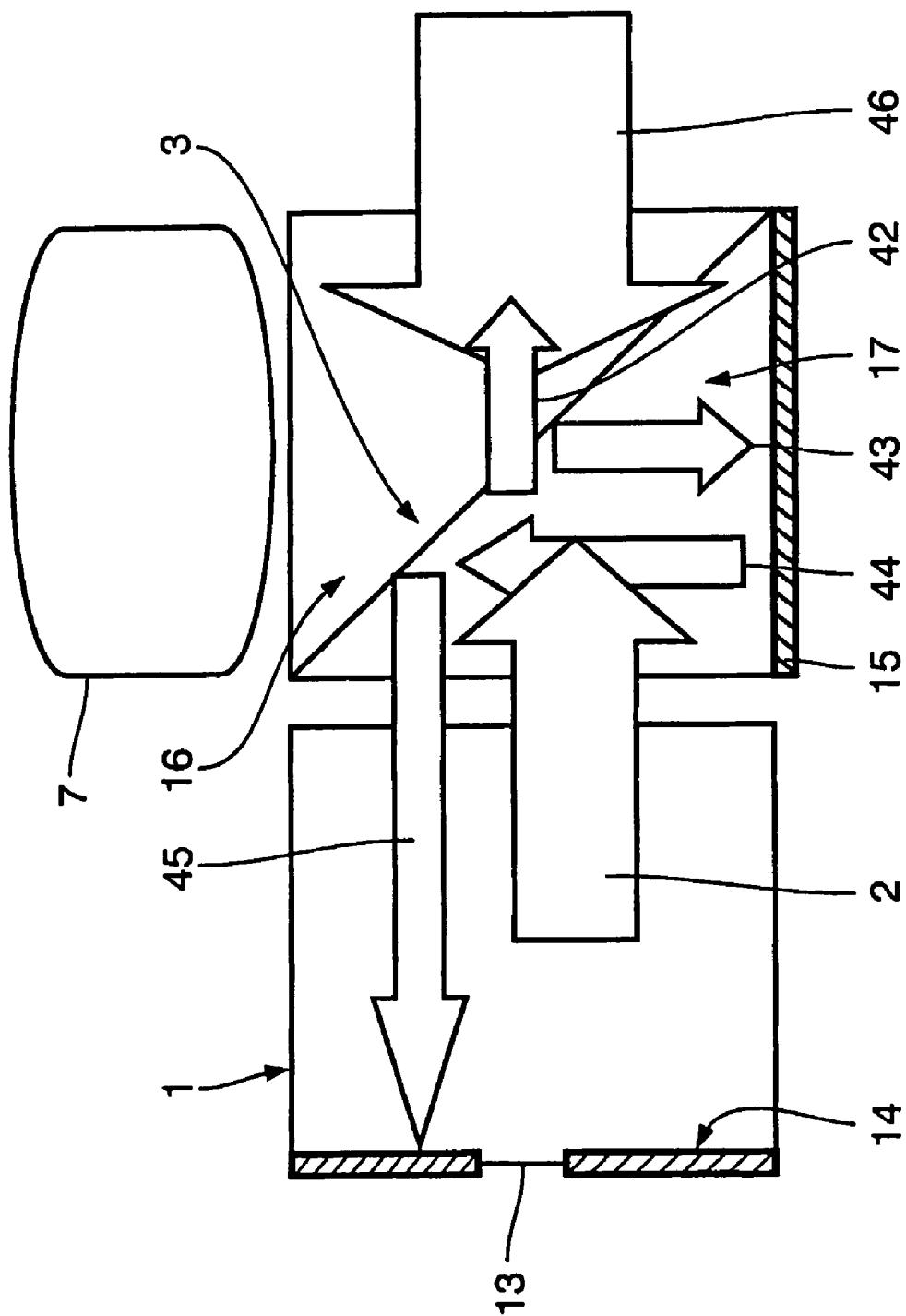
Figure 5:
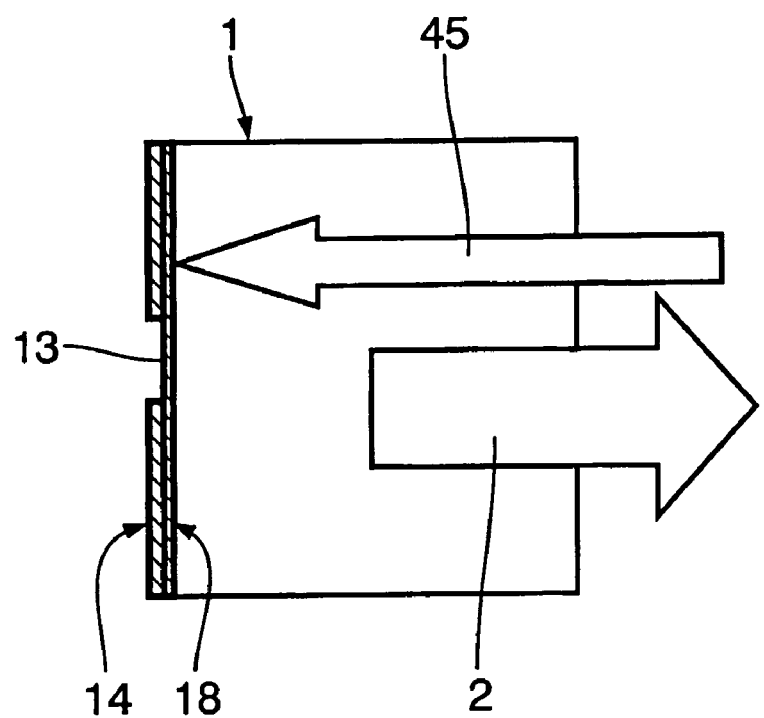
Figure 6:
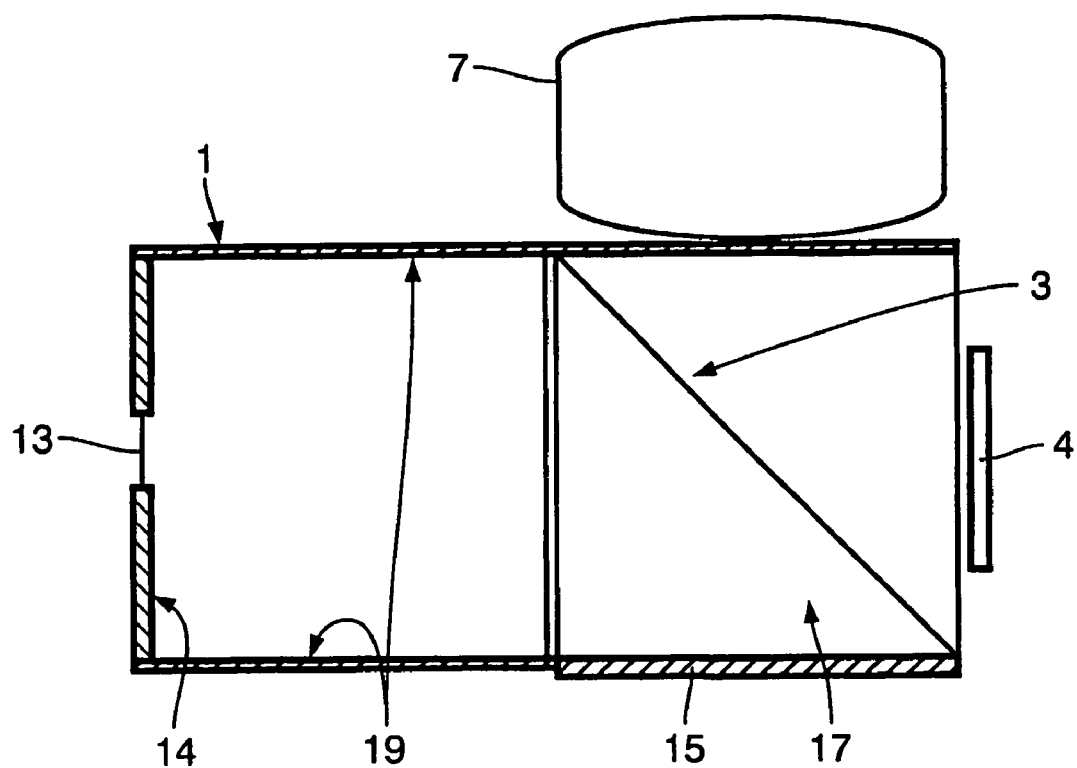
Figure 7:
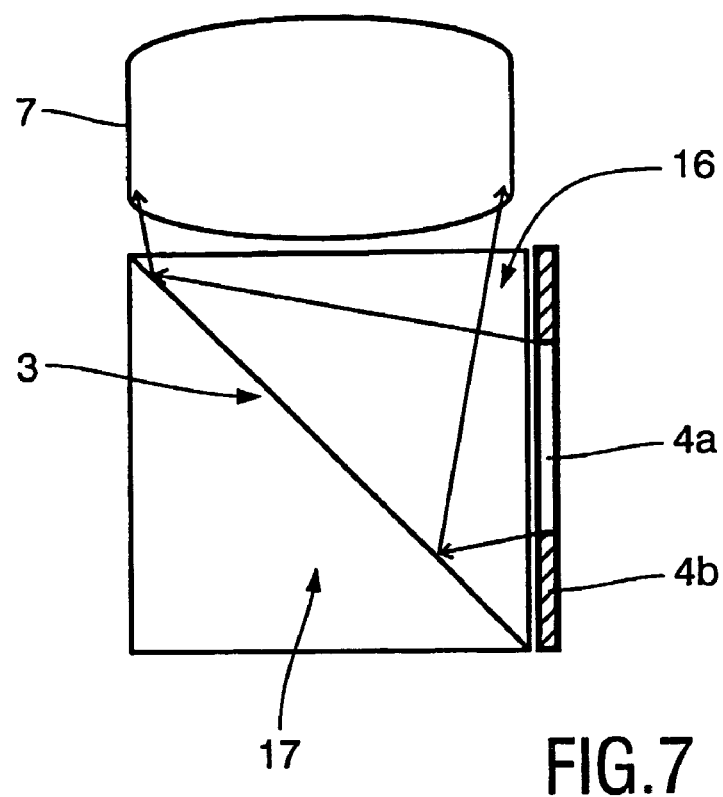
Figure 8:
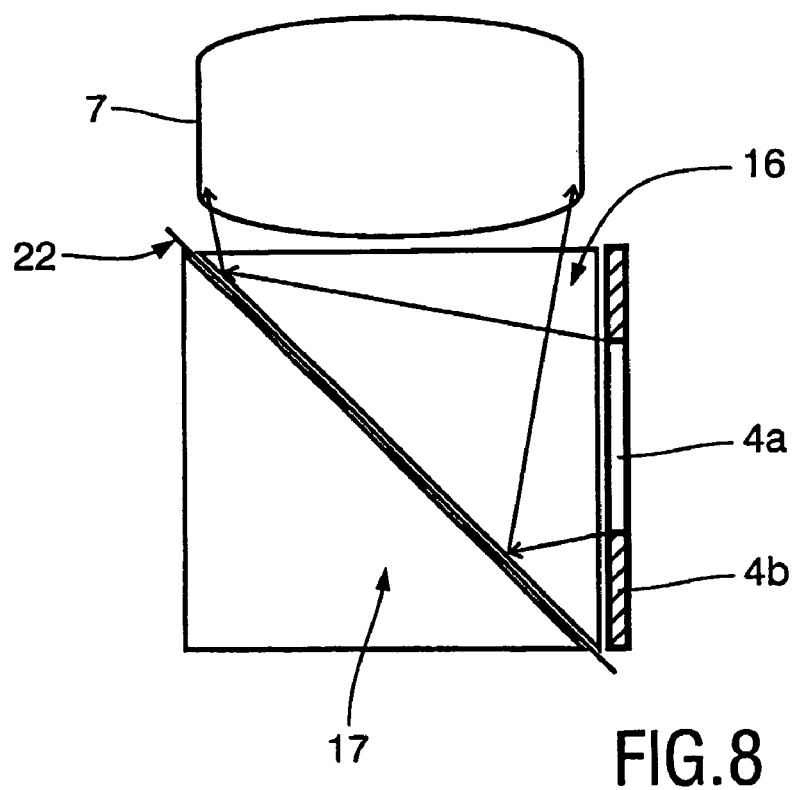
Figure 9:
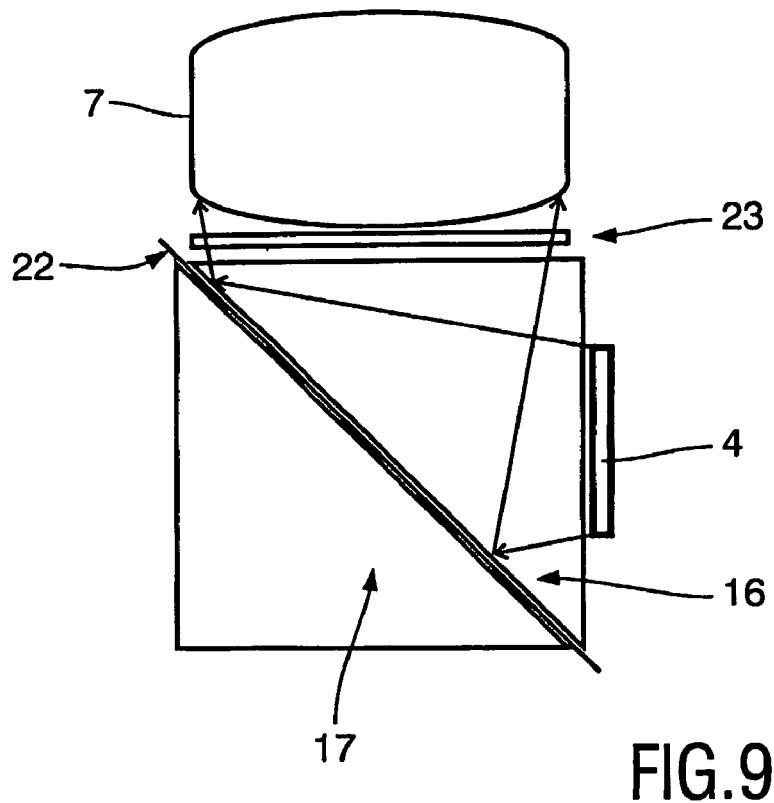
Figure 10:
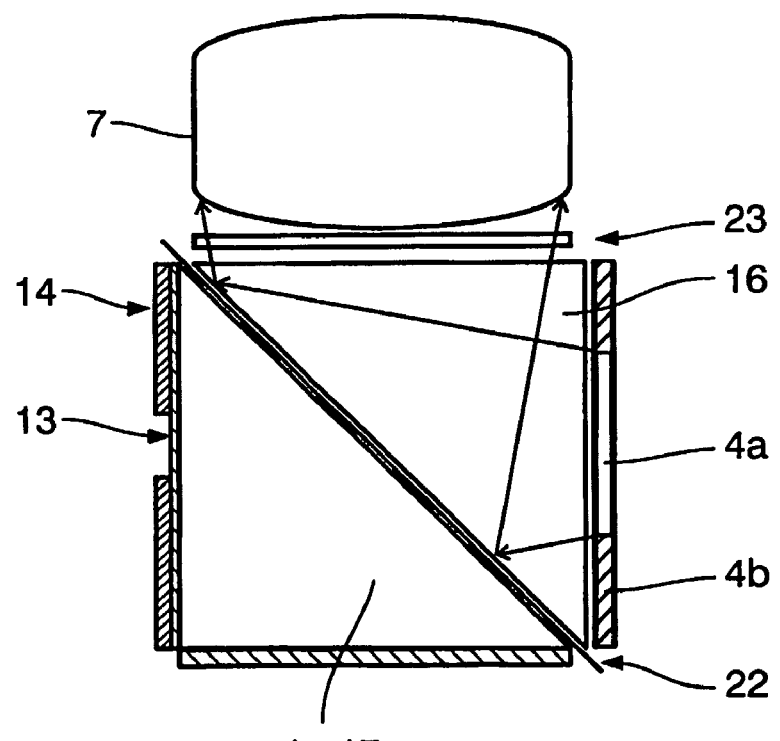

The invention will now be explained in more detail with reference to the drawings in which FIG. 1 shows an embodiment of a device for projecting an image according to the present invention, FIG. 2 shows a display panel, FIG. 3 shows an example for the composition of light rays within the display panel, FIG. 4 shows possible tracks for the light within the illumination means and the polarization-selective mirror, FIG. 5 shows the illumination means of another preferred embodiment, FIG. 6 shows a further embodiment of a device for projecting an image according to the present invention, FIG. 7 shows a further preferred embodiment wherein the polarization-selective mirror is integrated in a part of the illumination means, FIG. 8 shows a further preferred embodiment wherein the polarization-selective mirror is made of two prisms carrying a reflective polarizer in between, FIG. 9 shows a further preferred embodiment which comprises a clean-up polarizer, and FIG. 10 shows a further preferred embodiment which comprises a clean-up polarizer and a quarter-wave film.

A device for projecting an image according to the present invention is shown in FIG. 1. It comprises an illumination means 1, from which an incident polarized light beam 2 radiates to a polarization-selective mirror 3. A first polarization component of the light beam 2 is transmitted to a display panel 4. The transmitted light is filtered at a dichroic filter means 9, at which colour components of the light are either reflected back to the polarization-selective mirror 3 or transmitted to a controllable reflection means 6. At this controllable reflection means 6, the filtered colour components are also reflected back to the polarization-selective mirror 3 with or without a changed state of polarization depending on a control signal. At the polarization-selective mirror 3, all light that is reflected back from the display panel 4 having an unchanged state of polarization is transmitted through the polarization-selective mirror 3 back to the illumination means 1. Colour components which are reflected back from the display panel 4 having a changed state of polarization are reflected at the polarization-selective mirror 3 to a projection means 7. These colour components are supposed to be projected.

In FIG. 2, the display panel 4 is illustrated in more detail. A display panel 4 comprises a top glass plate 8 having a colour filter 9 attached and comprising a dichroic filter pattern. A liquid crystal layer 10 is arranged next to the colour filter 9. A liquid crystal layer 10 is controlled by reflective pixel electrodes 11 in combination with a semiconductor body 12 which contains an active matrix drive.

The functioning of the display panel of FIG. 2 is illustrated in more detail in FIG. 3. An incident polarized light beam 2 reaches the top glass plate 8. This light beam 2 is filtered at the colour filter 9. The colour filter 9 consists of three regions each for filtering one of the colour components red, green and blue, indicated by R, G and B. The upper region 9a of the colour filter 9 filters the colour component red which is transmitted to a reflective pixel electrode 11 and reflects the components blue and green. The middle region 9b of the colour filter 9 filters and therefore transmits the colour component green, and a lower region 9c transmits the colour component blue, respectively.

A reflective pixel 11a, 11b and 11c of the reflective pixel electrodes 11 belongs to each region 9a, 9b and 9c of the colour filter 9. In the example shown, only the pixel 11b controlling the green colour component is set to "on" and thus changes the state of polarization of the green colour component. As a result, the reflected light contains a green colour component having a changed state of polarization. All other components of the reflected light have an unchanged state of polarization. Reaching the polarization-selective mirror 3, this green colour component of the changed state of polarization will be reflected towards the projection means. All other components of the reflected light will be transmitted through the polarization-selective mirror 3 back to the illumination means 1.

In FIG. 4, the illumination means 1, the polarization-selective mirror 3 and the projection means 7 are shown to illustrate light recycling in the projection device. A light beam from a projection lamp enters the illumination means 1 via the opening 13 in the entrance mirror 14. Starting from the illumination means 1, a light beam 2 reaches the polarization-selective mirror 3. At the polarization-selective mirror 3, the light beam 2 is split into a first polarization component 42, which is transmitted to the display panel, and a second polarization component 43 which is reflected to a mirror 15. From the mirror 15, a second polarization component is reflected as the light ray 44 via the polarization-selective mirror 3 back to the illumination means 1 as the light ray 45. The first polarization component of the light 46, which is reflected from the display panel less the colour components of the changed state of polarization is transmitted through the polarization-selective mirror 6 back to the illumination means. Therefore, the reflected light rays of the first and second polarization components 46, 45 contain all light which was originally emitted from the illumination means 1 as the light beam 2, except for the colour components of the changed state of polarization which were reflected to the projection means 7. All the reflected light 46, 45 can be reflected at the entrance mirror 14, and thus will be fed back to the polarization-selective mirror 6 and will again be available for projection. Only a small amount of the light 46, 45 which is reflected back to the illumination means 1, which hits the opening in the entrance mirror 13, cannot be reused for projection. This principle of the projection device for projecting an image makes it clear that only a small portion of light is used for projection. At the same time, the other portion of the light which is not projected yet is recycled and can later be used for projection.

In the preferred embodiment shown in FIG. 4, the polarization-selective mirror 3 is formed by using two glass prisms 16, 17. In this design, the contact area of these two glass prisms 16, 17 comprises the polarization-selective mirror 3. The illumination means 1 is also formed, using a glass prism. This construction provides good optical properties.

FIG. 5 shows the illumination means 1 of a preferred embodiment. The main body of the illumination means 1 is a glass prism, by which good optical characteristics for the illumination means 1 can be achieved. However, other materials such as synthetic materials can also be used. The illumination means 1 further comprises an entrance mirror 14 with an opening 13. A quarter-wave film 18 is attached to the entrance mirror 14 facing the inside of the illumination means 1. When operating the projection device, light beam 2 is sent from the illumination means 1 towards the polarization-selective mirror 3. The second polarization component of this light ray 2 is reflected and returns as light ray 45 back to the illumination means 1, still comprising the second polarization component. When this light ray 45 reaches the quarter-wave film 18, which is attached to the entrance mirror 14, the state of polarization is changed. Therefore, after reflection at the entrance mirror 14, the light ray 45 contains the first polarization component and thus can now be transmitted through the polarization-selective mirror 3 to the display panel 4 and can be used for projection.

FIG. 6 shows another preferred embodiment of a projection device according to the present invention. The entire light path between the entrance mirror 14 and the display panel 4 contains reflective boundaries 19 to form a light tunnel, such that the light distribution is not changed in the direction towards the display panel 4. This light tunnel redistributes the light to the display panel 4, such that the display is homogenously illuminated.

The cross-sectional area of the display panel 4 is smaller than the cross-sectional area of the illumination means 1. The function of the projection device is generally independent of the size of the display panel 4. The size of the display panel 4 can be chosen to depend on aspects like the general construction of the projection device and costs.

FIG. 7 shows a display module or panel 4, which comprises a projection area 4a for reflecting light to the projection means 7 with a cross-sectional area smaller than the cross-sectional area of the illumination means 1 and a reflection area 4b surrounding the projection area 4a. The cross-sectional area of the projection area 4a is also smaller than the cross-sectional area of the projection means 7. It is illustrated that light is reflected from the projection area 4a via the polarization-selective mirror 3 to the projection means 7 and, represented by the two bordering light rays 48 and 49, spreads out from the smaller cross-sectional area of the projection area 4a to the larger cross-sectional area of the projection means 7. The reflection area 4b outside the projection area 4a reflects all light, which reaches the display panel 4 outside the projection area 4a back to the illumination means 1 and thus increases the efficiency of the use of light by using also light incident on the reflection area 4b.

FIG. 8 shows another embodiment of a polarization-selective mirror 3. The polarization-selective mirror 3 is formed by an imaging prism 16 which faces the display panel, an illumination prism 17 which faces the entrance mirror 14 and a selective polarizer 22 which is arranged in between the two prisms 16, 17. As one example, a wire grid polarizer can be used for the reflective polarizer 22. This arrangement provides a high quality of the polarization-selective mirror which has a large influence on the picture performance.

FIG. 9 shows a part of the projection device additionally containing a clean-up polarizer 23 which is arranged between the imaging prism 16 and the projection means 7. The polarization-selective mirror 3 reflects the colour component which is reflected from the display panel 4 and has changed the state of polarization but which also reflects a substantial part of the light having the unchanged state of polarization. Therefore, the light being reflected to the projection means 7 contains a significant part of the wrong polarization which degrades the contrast in the image. A clean-up polarizer 23 absorbs this wrong mode of polarization and thus dramatically increases the contrast of the projected image.

FIG. 10 shows a projection device, wherein the illumination means 1 is formed by the illumination prism 17. The Figure also shows that the body which is basically formed by the illumination prism 17 and the imaging prism 16 is bordered with reflective layers, except for the portion where light exits to the projection means 7.

The present invention provides a projection device for projecting a colour image that recycles most of the light which was not used for projection. This projection device has also a simple design and can thus be built at low production costs.

The invention claimed is:

1. A projection device for projecting an image, the device comprising:
    an illumination means having an entrance for entering light from a light source,
    a polarization-selective mirror for transmitting a first polarization component of said light and reflecting a second polarization component,
    a display panel having a dichroic filter means for filtering color components of said transmitted first polarization component and a controllable reflection means for changing the state of polarization of said color components depending on a control signal and for reflecting said filtered color components back to said polarization-selective mirror, and
    a projection means for projecting the image,
    wherein said polarization-selective mirror is adapted to reflect light of a changed state of polarization to said projection means and to transmit light of an unchanged state of polarization back to said illumination means.

2. The projection device of claim 1, wherein said illumination means includes an entrance mirror for reflecting light transmitted back from said polarization-selective mirror back to said polarization-selective mirror.

3. The projection device of claim 2, wherein said illumination means includes a quarter-wave film mounted on the entrance mirror to change the state of polarization of light reflected at said entrance mirror.

4. The projection device of claim 1, wherein said illumination means includes reflective boundaries for reflecting incident light without changing the light distribution.

5. The projection device of claim 1, wherein said illumination means includes a glass prism.

6. The projection device of claim 1, wherein said polarization-selective mirror is made of two prisms carrying a reflective polarizer in between.

7. The projection device of claim 6, wherein the reflective polarizer in between the two prisms is a wire grid polarizer.

8. The projection device of claim 1, wherein said polarization-selective mirror is integrated in a part of the illumination means, using a PBS prism.

9. The projection device of claim 1, wherein a clean-up polarizer is arranged in front of said projection means to filter light having the wrong state of polarization.

10. The projection device of claim 6, including an imaging prism for reflecting light to the projection means, said prism comprising glass having a low stress birefringence constant.

11. A projection device for projecting an image, the device comprising:
an illumination means having an entrance for entering light from a light
a polarization-selective mirror for transmitting a first polarization component of said light and reflecting a second polarization component,
a display panel having a dichroic filter means for filtering color components of said transmitted first polarization component and a controllable reflection means for changing the state of polarization of said color components depending on a control signal and for reflecting said filtered color components back to said polarization-selective mirror, and
a protection means for protecting the image,
wherein said polarization-selective mirror is adapted to reflect light of a changed state of polarization to said projection means and to transmit light of an unchanged state of polarization back to said illumination means, wherein said display panel includes a projection area for reflecting light to the projection means having a cross-sectional area that is smaller than the cross-sectional area of the illumination means and a reflection area outside the projection area with a reflective layer for reflecting light back to the illumination means.

12. The projection device of claim 1, wherein said dichroic filter means includes a filter pattern made of cholesteric filters or of a stack of layers of interference filters.

13. A projection device arranged to project an image comprising, the device comprising:
a side comprising an aperture arranged to enable light to enter from a light source,
a polarization-selective mirror arranged to transmit a first polarization component of said light and reflect a second polarization component,
a display panel comprising:
a dichroic filter arranged to filter color components of said transmitted first polarization component, and
a controllable reflector arranged to change the state of polarization of said color components depending on a control signal and to reflect said filtered color components back to said polarization-selective mirror, and
a projector arranged to project the image,
wherein said polarization-selective mirror is adapted to reflect light of a changed state of polarization to said projection means and to transmit light of an unchanged state of polarization back to said side.

14. The projection device of claim 13, wherein said side comprises an entrance mirror arranged to reflect light transmitted back from said polarization-selective mirror back to said polarization-selective mirror.

15. The projection device of claim 14, wherein said side comprises a quarter-wave film mounted on the entrance mirror, the quarter-wave film arranged to change the state of polarization of light reflected at said entrance mirror.

16. The projection device of claim 13, wherein said side comprises reflective boundaries arranged to reflect incident light without changing the light distribution.

17. The projection device of claim 13, wherein said polarization-selective mirror comprises two prisms and a reflective polarizer arranged between the two prisms.

18. The projection device of claim 13, wherein said polarization-selective mirror is integrated in a part of the side as a PBS prism.

19. The projection device of claim 13, wherein said display panel comprises a projection area arranged to reflect light to the projector with a cross-sectional area that is smaller than a cross-sectional area of the side, and a reflection area positioned outside the projection area, the reflection area comprising a reflective layer arranged to reflect light back to the side.

20. The projection device of claim 13, wherein said dichroic filter comprises a filter pattern made of one of cholesteric filters and a stack of layers of interference filters.

* * * * *